Sept. 11, 1962     M. C. SANZ     3,053,138
SAMPLE HOLDER FOR PHOTOMETRIC ANALYZING APPARATUS
Filed July 7, 1958

MANUEL C. SANZ
*INVENTOR.*

BY
*Fleshing Swain*
ATTORNEYS

United States Patent Office 3,053,138
Patented Sept. 11, 1962

3,053,138
SAMPLE HOLDER FOR PHOTOMETRIC
ANALYZING APPARATUS
Manuel C. Sanz, Rte. de Ferney, Versoix (Geneva),
Switzerland
Filed July 7, 1958, Ser. No. 746,836
2 Claims. (Cl. 88—14)

This invention relates generally to a sample holder for photometric analyzing apparatus.

In prior art photometric analyzing apparatus, the samples to be analyzed are placed in individual test tubes or other receptacles. The tubes or receptacles are then individually placed in the apparatus for analysis. Variations in the transmission characteristics of the test tubes or receptacles introduce errors in the final determinations. The process of individually removing and replacing the various sample holders is time consuming and in itself may lead to errors.

It is a general object of the present invention to provide an improved sample holder for photometric analyzing apparatus.

It is another object of the present invention to provide a sample holder in which a number of samples each having a relatively small volume may be successively analyzed without removal of the sample holder from the apparatus.

It is another object of the present invention to provide a sample holder for photometric analyzing apparatus which employs a flat sided elongated tube or cell to hold the sample and in which the sample is removed from the bottom of the cell by application of a vacuum upon completion of an analysis.

It is a further object of the present invention to provide a sample holder of the above character which is placed in the apparatus and calibrated and which may then be used to carry out a plurality of measurements without removing the same from the apparatus.

These and other objects of the invention will become more clearly apparent from the following description when read in conjunction with the accompanying drawing.

Referring to the drawing.

Figure 5:
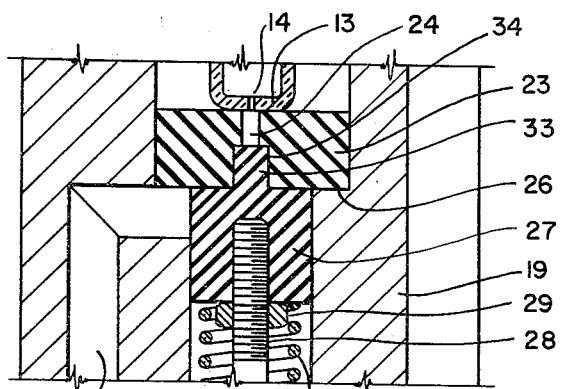
FIGURE 5 is an enlarged sectional view of the lower portion of FIGURE 1.

Referring to the figures, the novel sample holder is illustrated in detail. The sample holder includes a tube or cell 11 which has a funnel-like opening 12 at one end, and which is closed at its lower end 13. The lower end 13 is provided with a relatively small opening 14, FIGURE 5. The liquid sample contained within the tube is removed through this opening upon the completion of an analysis.

Figure 1:
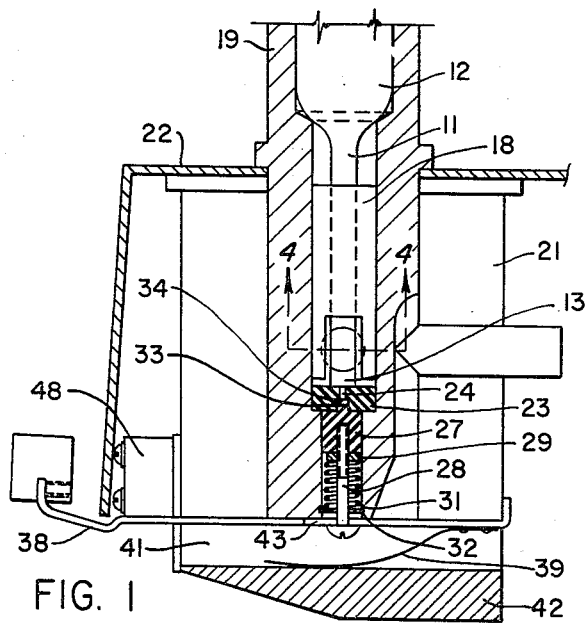
FIGURE 1 is an elevational view, partly in section, showing the sample holder disposed in photometric analyzing apparatus.
Figure 4:
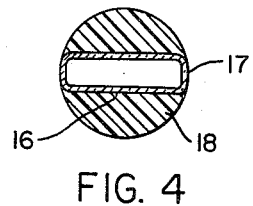
FIGURE 4 is a sectional view taken along the line 4—4 of FIGURE 1.
Figure 2:
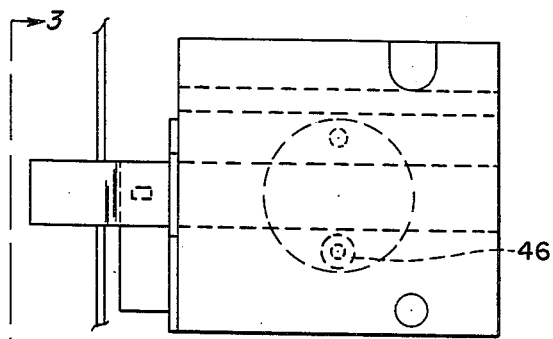
FIGURE 2 is a bottom view of the apparatus of FIGURE 1.
Figure 3:
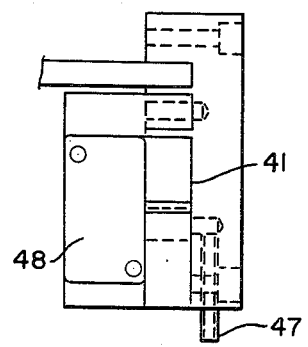
FIGURE 3 is a side elevational view of the bottom portion of the apparatus.

In cross-section, the tube has generally flat sides 16 with generally rounded ends 17 (FIGURE 4). The tube in operation is inserted with the flat side 16 parallel to the light beam whereby the light travels through a maximum length of sample.

The tube is accommodated within a spacer 18 which may be unplasticized polyvinyl chloride. The spacer and complete tube are then placed within a housing 19 which may also be rigid unplasticized polyvinyl chloride. The complete assembly is placed within the analyzing block 21 of the associated photometric analyzing apparatus. As illustrated, the block 21 is secured to a housing 22, a small portion of which is shown. The complete housing or block is not shown. However, a description of analyzing apparatus of this type is available with reference to the Beckman Instrument Model "C" Colorimeter.

The lower end of the tube is seated against a relatively hard resilient material 23 which may, for example, be silicon rubber. A tight fit is obtained between the lower surface of the tube and the material 23. The material 23 has an opening 24 which registers with the opening 14 formed in the bottom of the tube. The resilient material is seated in the shoulder 26 formed in the housing 19. The tube is held coaxially in the housing by means of the spacer as previously described.

The lower end of the housing 19 accommodates a plug 27 which may be made of resilient material such as silicon rubber. The plug is carried on the end of a screw 28 which is locked thereto by a lock nut 29. A spring 31 surrounds the screw and is compressed between the plug 27 and a ring 32, for example, a Tru-arc ring, carried at the lower end of the housing. Thus, the plug 27 is urged upwardly. The plug 27 has a portion of reduced diameter 33 which rides within the accommodating recess 34 formed in the member 23. The plug 27 serves to close the opening 14 during a determination.

A passage 36 is formed in the member 19 and communicates with the cylindrical opening adjacent the plug 27. When the plug is drawn downwardly, a continuous passage exists from the sample holder through the opening 24 and outwardly through the opening 36. As will be presently described, a vacuum is simultaneously applied to the passage 36 with opening of the passage and the liquid within the sample holder is withdrawn.

The plug 27 may be actuated by the arm 38 which engages the head of the screw 28 and which is spring loaded by means of a spring 39. The arm 38 and spring 39 are accommodated within the slot 41 formed in the lower block 42. The block 42 is adapted to be secured to the main block 21. The arm 38 includes an opening 43 which is enlarged at one end which allows the screw head to pass through to permit replacement of the sample holder. Thus, to replace the sample holder, the arm 38 is moved to the right as viewed in the figure and the sample holder is removed by lifting. In operation, the sample holder is placed within the block 21 and the arm 38 drawn to engage the screw.

The block 42 includes a passage 46 which registers with the passage 36. The passage 46 is provided with a nipple 47 to which a suitable vacuum may be applied for drawing out the sample. A switch 48 may be mounted on the block 21 and serves to energize a vacuum pump motor when the arm 38 is pressed downwardly.

Operation of the apparatus is as follows. The sample holder is placed within the block 21 and an opaque liquid is placed within the sample holder. The apparatus is adjusted for zero reading with the opaque liquid in the cell. The opaque fluid is then drawn out and the sample holder is suitably washed, for example, by using a detergent. Subsequently, the sample holder may be washed with acetone containing about 1% caprylic alcohol or the like. Subsequent washing with pure water leaves the sample holder clean. A sample is then placed in the sample holder and a measurement taken. The apparatus must be calibrated. In calibrating, standard solutions are employed and a calibration curve is obtained. Subsequently, the curve is employed to interpret readings which are obtained from samples under test.

Upon completion of a determination, the arm 38 is pressed downwardly, the vacuum pump is energized, and the sample is drawn out from the bottom of the holder. A new sample may be added at the top 12. If desired, washing may be carried on between tests by placing a suitable detergent or clean water in the sample holder and removing it by applying a vacuum.

It is apparent that the holder described has many advantages. Once the holder is aligned, there can be no change in alignment. Further, there can be no changes in the optical path as are encountered when changing from one test tube to another. The apparatus is suitable for performing photometric analysis of a large number of successive samples. The apparatus is so constructed that it is suitable for measuring the photometric characteristics of samples of relatively small volume.

I claim:

1. A sample holder for photometric analyzing apparatus comprising a housing, a tube for holding a liquid sample to be tested having an opening at its upper end and converging at its lower end, said lower end containing an orifice of relatively small diameter with respect to the cross-sectional size of said tube, means in said housing to hold said tube in upright position, sealing means in said housing supporting the lower end of said tube, said sealing means containing an opening coaxial with the orifice in said tube, conduit means within said housing adapted to be connected to a vacuum, said conduit means extending up to a point adjacent said opening in said sealing means, plug means adapted to extend into the opening in said sealing means and simultaneously close the end of said conduit means whereby to isolate said conduit from said opening in the sealing means, means to move said plug to provide communication between said conduit means and the opening in said sealing means whereby to remove a sample held in said tube.

2. Apparatus as in claim 1 in which the lower end of said tube, in section, has relatively long sides connected by short rounded end portions.

References Cited in the file of this patent

UNITED STATES PATENTS

| 960,912 | Heany | June 7, 1910 |
| 961,419 | Muchka | June 14, 1910 |
| 1,133,065 | Shutz | Mar. 23, 1915 |
| 1,794,134 | Baker et al. | Feb. 24, 1931 |
| 1,916,589 | Sheftel | July 4, 1933 |
| 2,090,041 | Gross | Aug. 17, 1937 |
| 2,446,668 | Tuttle et al. | Aug. 10, 1948 |